(12) United States Patent (10) Patent No.: US 7,890,578 B2
Cheng et al. (45) Date of Patent: Feb. 15, 2011

(54) METHOD, SERVER, CLIENT AND SYSTEM FOR CONTROLLING DOWNLOAD AND DISPLAY OF WEB PAGES

(75) Inventors: Long Cheng, Beijing (CN); Xing Fang, Beijing (CN); Dong Jun Lan, Beijing (CN); Sheng Lu, Beijing (CN); Qingbo Wang, Beijing (CN); Meng Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/016,549

(22) Filed: Jan. 18, 2008

(65) Prior Publication Data

US 2009/0013034 A1 Jan. 8, 2009

(30) Foreign Application Priority Data

Jan. 19, 2007 (CN) .......................... 2007 1 0003983

(51) Int. Cl.
*G06F 15/16* (2006.01)
(52) U.S. Cl. ..................... 709/203; 709/217; 709/218; 709/219
(58) Field of Classification Search .................. 709/203, 709/217, 218, 219
See application file for complete search history.

(56) References Cited

U.S. PATENT DOCUMENTS

| | | | |
|---|---|---|---|
| 6,314,415 B1 | 11/2001 | Mukherjee | |
| 6,593,943 B1 | 7/2003 | MacPhail | |
| 7,028,264 B2 | 4/2006 | Santoro | |
| 2001/0037256 A1* | 11/2001 | Yazawa | 705/26 |
| 2005/0027815 A1* | 2/2005 | Christodoulou et al. | 709/217 |
| 2005/0108350 A1 | 5/2005 | Dietz | |
| 2005/0114207 A1 | 5/2005 | Jania | |
| 2005/0129042 A1* | 6/2005 | Muhonen et al. | 370/412 |
| 2005/0177853 A1* | 8/2005 | Williams et al. | 725/81 |
| 2006/0020884 A1 | 1/2006 | Graham | |
| 2006/0069808 A1 | 3/2006 | Mitchell | |
| 2006/0168578 A1* | 7/2006 | Vorlicek | 717/168 |

* cited by examiner

*Primary Examiner*—Wing F Chan
*Assistant Examiner*—Kostas Katsikis
(74) *Attorney, Agent, or Firm*—William Stock; Anne Vachon Dougherty

(57) ABSTRACT

A method for controlling display of a web page on the client, the contents in said web page being assigned different priorities, includes sending an access request for the web page from the client to the server; in response to said access request, the server sending controllers for implementing prioritization of said contents in the web page to the client, and the controllers retrieving the web page contents the server according to the priority order thereof for display. With the system and method, it is possible to prioritize different contents in a web page and to ensure contents with higher priority are downloaded and displayed earlier than those with lower priority, and thereby avoiding the disadvantage of multi-thread parallel download in the prior art.

18 Claims, 7 Drawing Sheets

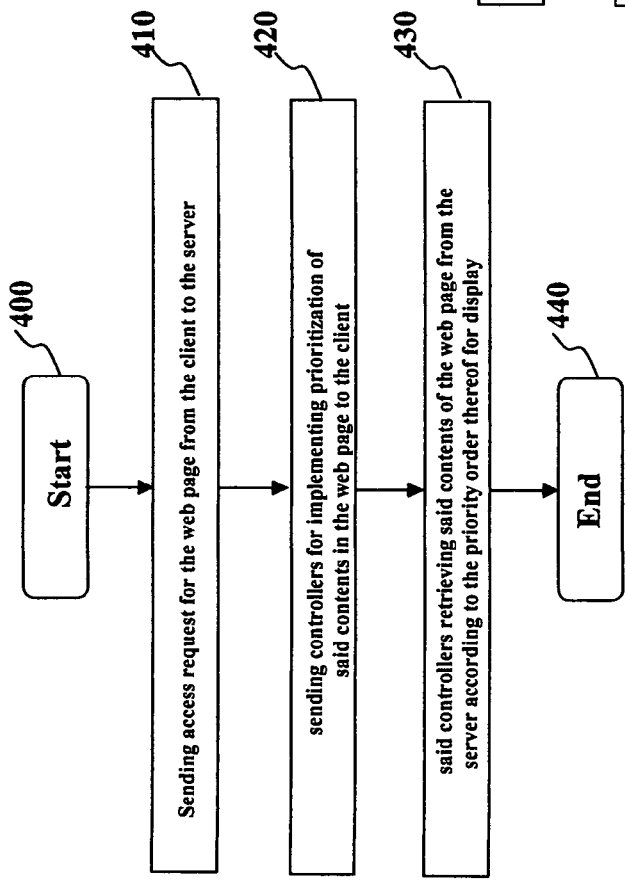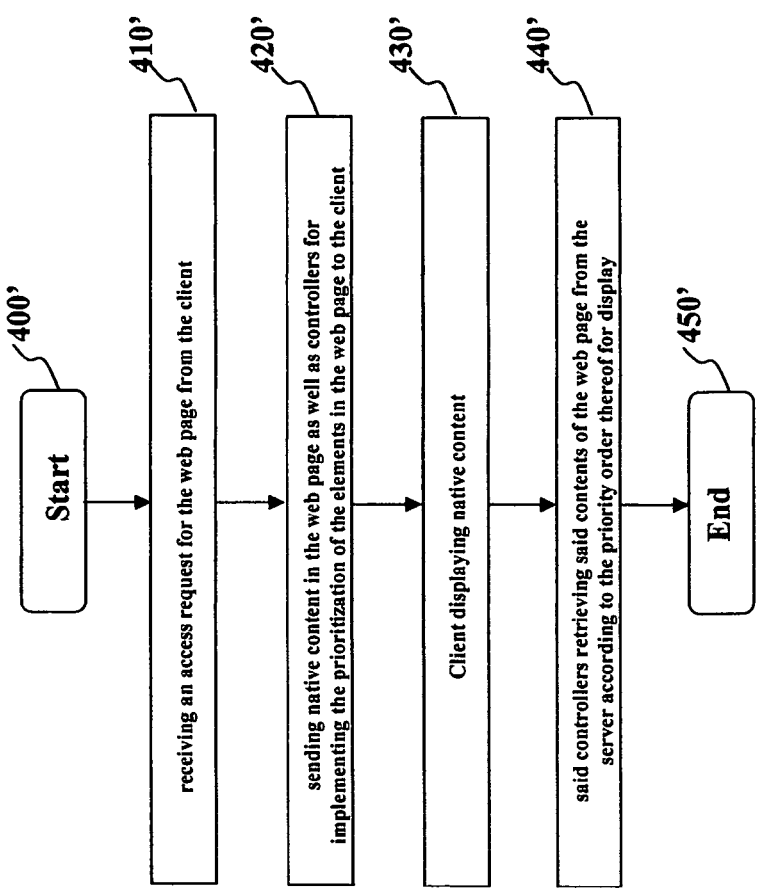
Figure 4A
Figure 4B

US 7,890,578 B2

METHOD, SERVER, CLIENT AND SYSTEM FOR CONTROLLING DOWNLOAD AND DISPLAY OF WEB PAGES

FIELD OF THE INVENTION

The present invention relates to information technology, and more particularly to method, server, client browser and system for controlling download and display of web pages.

BACKGROUND OF THE INVENTION

With the development of computer network technology, people can access millions of web sites and billions of web pages over the internet. Like newspapers, these various web pages have layouts. FIG. 1 shows a typical layout of web page 10, including such layout elements as news header 11, news body 12, related links 13, top banner 14, vertical banner 15 and bottom banner 16 as well as possible rolling advertisements (not shown). Web pages developed and deployed by different designers and developers may have different template, and various parts of the web layout/elements often indicate different information, e.g., the navigator, the content, and the advertisement and so on.

For web pages, the elements in the layout may have different values for different audience. For example, an ordinary user usually only cares about news content on the web page, whereas an advertiser may care more about the ad information. However, currently when the web layout/elements are downloaded to the user's browsers, they are not prioritized according to their importance and business values. Rather, their download and display are fully dependent upon the download speed of the web layout/elements, and they are downloaded to the browser purely randomly, even during the network peak time. Due to the present multi-thread parallel download mechanism during web page downloading, the web elements are non-discriminatively served, which means it might take a long time to download contents that turn out to be of no interest to the user, and it might be not possible for the contents that the user is interested in to be finally downloaded and displayed (this largely depends on the status of the application server, network, client and browser). Likewise, the advertisers have similar demand, although their prioritization of the elements might be totally different from that of ordinary users.

Presently, there are only guidelines, or principles to help the design of the layout of the web pages/web elements, i.e., the fonts, the images, etc., but no system provided for developers to annotate the different parts of the layout with different priority level and priority type. There is also no system to enforce the prioritization of web content during runtime. In addition, in high volume condition, there is optimization mechanism according to the different service level agreement of customers (for example, different user have different speed for downloading and display as well as different update cycle), however, this does not relate to the differentiation of the web contents itself. Moreover, the current optimization granularity is cross page level and highly dependent on the web application server.

Therefore, it is desirable to implement systematic optimization consideration of the collaboration of both client and application server side.

SUMMARY OF THE INVENTION

In light of the above, a novel method, server, client and system for controlling download and display of web pages is proposed. The invention takes into account the conditions during web page design time, runtime and peak time, and it can overcome problems currently existing.

According to the first aspect of the invention, a method for controlling display of a web page on the client is provided. The contents in said web page are assigned different priorities, and said method comprising:

sending an access request for the web page from the client to the server;

in response to said access request, the server sending controllers for implementing prioritization of said contents in the web page to the client; and said controller retrieving said contents of the web page from the server according to the priority order thereof for display.

In the present invention, during creation of web pages, different contents are assigned different priorities as needed. For example, a high priority is given to news content which is of interest to the user, while a low priority to other contents such as advertisements. As a result, when retrieving contents from the server via the controllers, the contents with high priority are retrieved and displayed earlier than those with lower priority. This enables the prioritization of different contents in a web page, ensuring high priority contents are downloaded and displayed before those with lower priority, thereby avoiding the disadvantages associated with existing multi-thread parallel download.

According to the invention, said contents can be layout framework, or various parts in said layout framework. Therefore, the invention enables the server to implement prioritization of different granularity as necessary.

According to the invention, policies can be pre-defined, so that demands for retrieving certain contents can be passed or rejected. Therefore, the invention can implement congestion management during network peak time.

According to the invention, said contents are further divided as native content and elements, wherein said method comprising:

in response to said request, said server sending the native content and controllers for implementing prioritization of said contents in the web page to the client, said client displaying said native content, and said controller retrieving said elements of the web page from the server according to the priority order thereof for display.

In this way, the retrieve and display of the native content is facilitated.

According to a second aspect of the invention, a server for controlling display of a web page on the client is provided. The contents in said web page are assigned different priorities, and said server comprising:

request receiving means for receiving an access request for the web page from the client;

response sending means for sending controllers for implementing prioritization of said contents in the web page to the client in response to said access request.

According to a third aspect of the invention, a client for displaying web pages is provided, the contents in said web page are assigned different priorities, and said client comprising:

request sending means for sending an access request for the web page to the server;

response receiving means for receiving controllers from the server for implementing prioritization of said contents in the web page from the server, so that said controllers retrieving contents from the server according to the priority order of the contents; and browser for displaying the retrieved contents.

According to a fourth aspect of the invention, a system for controlling display of a web page is provided, the contents in said web page are assigned different priorities, and said system comprising:

server, comprising:

request receiving means for receiving an access request for the web page from the client;

response sending means for sending controllers for implementing prioritization of said contents in the web page to the client in response to said access request; and client, comprising:

request sending means for sending an access request for the web page to the server;

response receiving means for receiving from the server controllers for implementing prioritization of said contents in the web page from the server, so that said controllers retrieving contents from the server according to the priority order of the contents;

browser for displaying the retrieved contents.

BRIEF DESCRIPTION OF THE DRAWINGS

The foregoing and other objects, aspects, and advantages will be better understood from the following non-limiting detailed description of preferred embodiments of the invention with reference to the drawings that include the following:

FIG. 4A is a flowchart of the method performed by the system of FIG. 3.

FIG. 4B is a modification of the method of FIG. 4A.

DETAILED DESCRIPTION OF THE INVENTION

Figure 1:
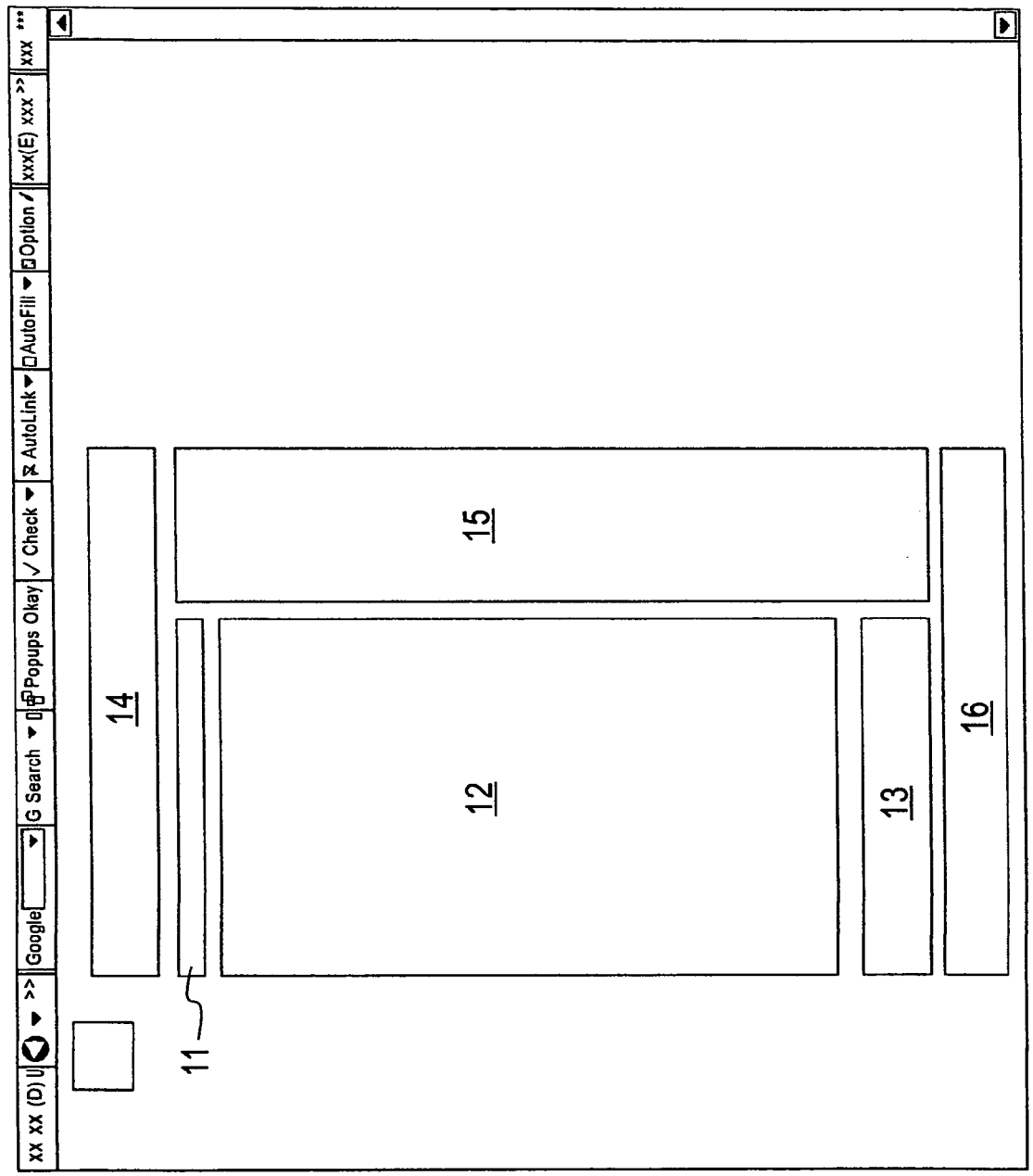
FIG. 1 illustrates a typical layout of a web page.

Before description of the embodiments of the invention with reference to the accompanying drawings, some of the technical information involved in the invention is introduced first.

As mentioned above, to implement the invention, different contents in the web page need to be tagged with a priority according to their importance and business values when the web page is created. It should be understood that there are a plurality of languages and means for creating a web page, and the languages and means in which the web page is created is irrelevant to the invention. Moreover, whatever languages or means are used, it is commonplace to tag the content therein with a priority. Therefore, the detailed technology in this regard will not be detailed.

Controller

Below the controllers for retrieving and displaying contents in a web page during runtime and the operation thereof will be described.

The Generation and Composition of a Controller

After contents within a web page are tagged with a priority during web page creation, when the web page is read from the server, the controllers for implementing the prioritization of the contents can be generated either manually by the developer or automatically by the server. Generating a controller from the web page source code is well-known in the art, the detailed description thereof will be omitted.

The controller comprises a demand controller and a view controller. Said demand controller comprises logic for controlling the retrieval of content from the server to the client, and further comprises a demand helper corresponding to the content. Said view controller comprises logic for displaying the retrieved content on the client, and further comprises a view activator corresponding to the content.

Also in said controller, each part of the content is identified by its unique identifier, and each part of the content corresponds to a demand helper, a view activator, and can possibly correspond to a front dispatcher and a delegate.

The Operation of the Controller

During runtime, the controller is deployed to the client as part of the response by the server to the web page request received from the client. After being deployed to the client, said demand controller activates the demand helper and view activator on a one content to one content basis according to the order of the content prioritization (e.g. from high to low priority). Thereafter, the demand helper of each content part retrieves the content from the server, by using the unique identifier of the content, to the corresponding view activator, and then to the view controller by said view activator, so that the content is displayed or rendered on the client browser. The above operation is performed on each part of the content, until all the contents on the web page are retrieved and displayed. It should be noted that for said view controller, the logic for the view controller to display content on the client (e.g., display time length and display order of the content) can be defined when the web page is created by the developer, and said view controller performs the display and rendering in compliance with said logic.

If the content to be retrieved from the server is for example simply a picture, the demand helper can retrieve it from the server by using the above structure and operation. However, if the content is for example data or information that can only be retrieved after certain background functions are carried out, said content may further contain a corresponding front dispatcher and delegate, and said demand helper needs to pass through said dispatcher and delegate when retrieving the content, as described below.

A front dispatcher contains modules divided according to functions, which are embodied as servelet for performing a particular function. Several contents that are implemented by one servelet belong to the same front dispatcher. For example, several contents related to weather information can correspond to one weather front dispatcher, while several contents related to stock information can correspond to one stock front dispatcher. When content has a front dispatcher, the demand from the demand helper for retrieving content from the server first arrives at the front dispatcher, which in turns finds the corresponding delegate. A delegate is often a certain operation performed on the content (e.g., the logic GET operation, etc.). After the manipulation at the delegate, the content is retrieved to the view activator and rendered by the view controller.

Prioritization Granularity

In the invention, "content" can have two levels of meaning, depending on the Prioritization Granularity that can be implemented by the server. Again refer to FIG. 1, with coarse granularity, "content" can refer to the various layout frameworks themselves designated by reference signs 11-16 (that is, the prioritization is among the frames). With fine granularity, besides the frames, the "content" can also refer to the specific content (such us links, images, and ads) within the frames (that is, not only the frames are prioritized, but also the contents therein). It should be noted, when contents are prioritized with fine granularity, the contents within the layout framework can be prioritized based on the priority of the layout framework (i.e., the priorities of contents within a layout frame having a high priority are always higher than the priorities of contents within a layout frame having a low priority), or the priorities can be assigned to the content from the perspective of the entire web page without observing the boundary of the layout framework.

Implementation Details

According to the invention, after contents within a web page are annotated with priorities, different contents can be further divided into "native content" and "element".

"Native content" refers to those contents that are deemed by the developers or web sites as having the highest priority and that should be downloaded and displayed on the client browser before all others. Native content differs from one web site type to another. As an example, for a web site that provides information to the user, native content is usually news message in the form of text (in the web layout of FIG. 1, can be the news body 12), while for a web site that profits by advertising, native content may be the advertisement having the highest priority (e.g., which advertisement pays the most).

In a web page, contents other than the native content are called "elements". Different elements have different priorities, and all elements are lower in priority than the native content.

According to the invention, either identical or different download and display mechanisms can be implemented for the native content and the elements, as described below.

The embodiments of the invention will be described below with reference to the drawings.

Figure 2:
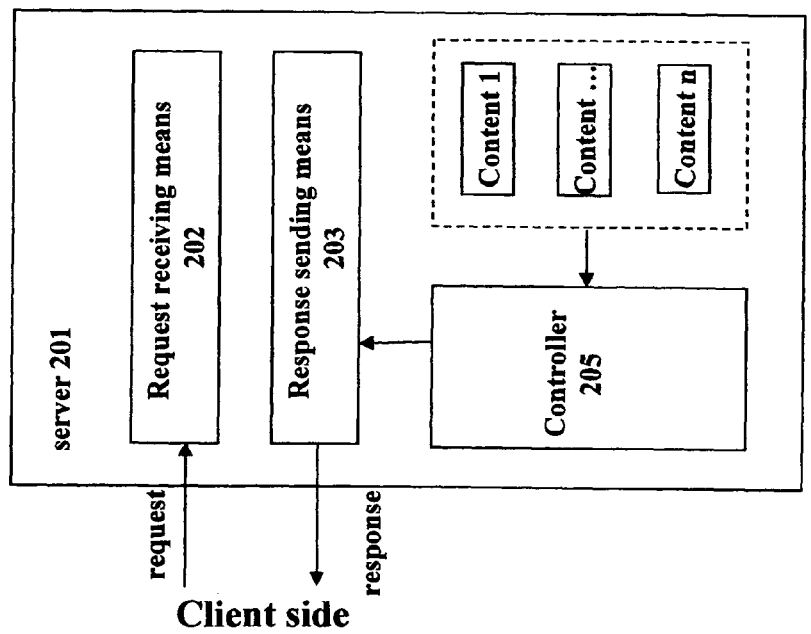
FIG. 2 is a block diagram of the server according to the invention.

First, FIG. 2 is referred to, wherein the block diagram of the server 201 according to the invention is shown. Said server 201 comprises a request receiving means 202, for receiving an access request for the web page from the client; and a response sending means 203, for sending controller 205 for implementing prioritization of contents in the requested web page to the client, in response to said access request.

The invention makes it possible to prioritize different contents in a web page and ensure contents with higher priority are downloaded to and displayed on the client browser earlier, by first sending the controller to the client, and then retrieving said contents from server by said controllers according to the priority of each content for display.

In the server of FIG. 2, although the request receiving means 202 and response sending means 203 are shown as separate from each other, they can be integrated together, e.g., implemented by a native servelet such as JSP, ASP, etc. In addition, while in FIG. 2 the controller 205 and elements 1-n reside in the server, they can be stored external to the server and be called by the server when necessary.

Figure 3:
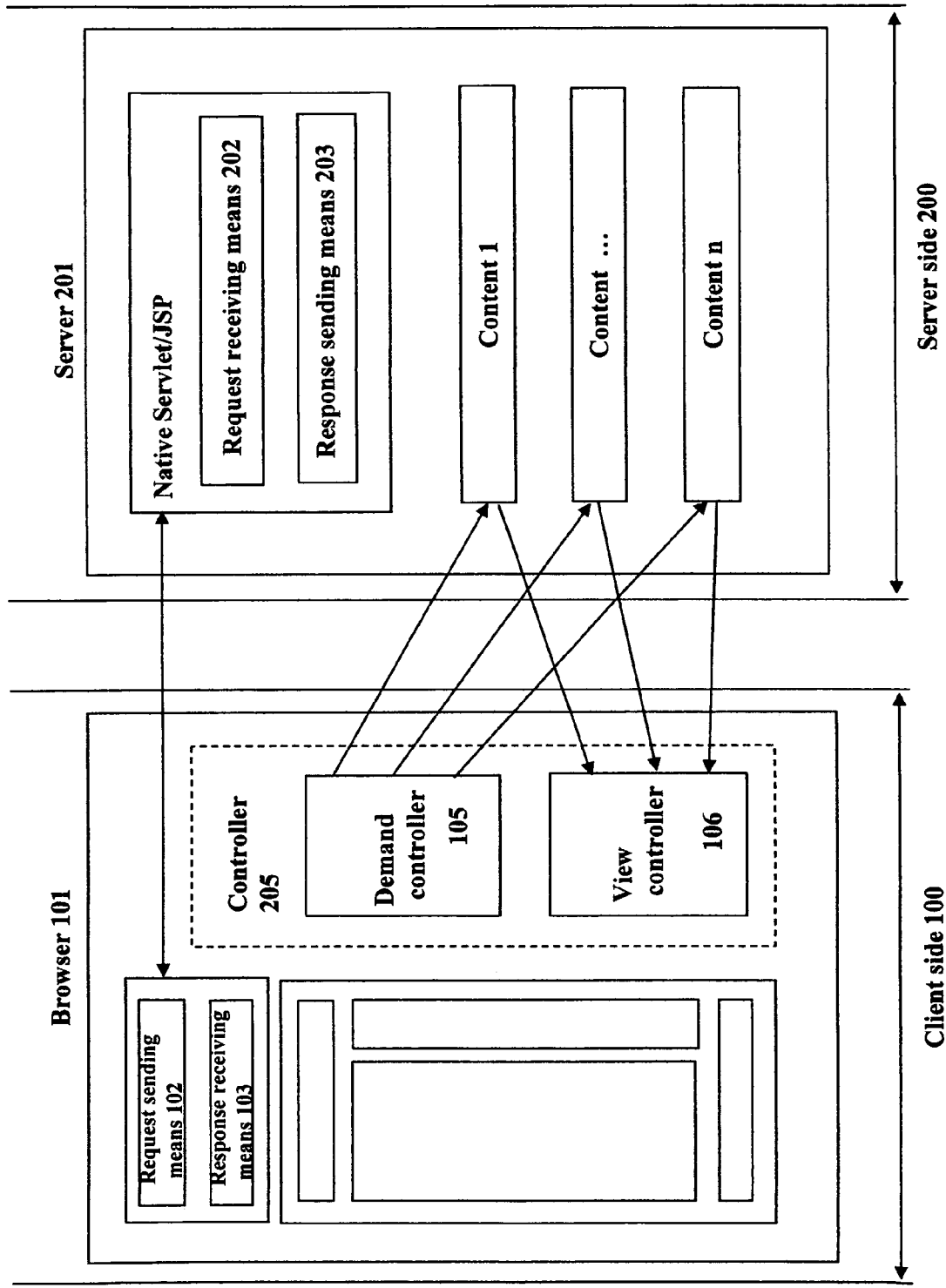
FIG. 3 is an overall block diagram of the system according to the invention.

FIG. 3 is an overall block diagram of the system according to the invention, said system comprises client 100 and server 200.

Said server side 200 comprises server 201, said server 201 is the same as that in FIG. 2, except that FIG. 2 shows the situation before a web page request is received from client 100, while FIG. 3 shows the situation after a web page request is received from client 100.

Said client 100 comprises browser 101, which can further comprise request sending means 102 and response receiving means 103. The user can send an access request for the web page to server 201 via the request sending means 102, and said response receiving means 103 is used for receiving controllers in the web page from the server 201, for deployment in the client side 200.

When the client side 100 requests a web page from server side 200, the response sending means 203 of the server 201 deploys the controllers 205 of the requested web page to the client side 200. As a consequence of this, in the client side 200, controllers 205 can start retrieving contents within the requested web page according the priority thereof.

FIG. 4A is a flowchart of the method performed by the system of FIG. 3. The method of FIG. 4A begins in step 400 and then proceeds to step 410, wherein an access request for the web page is sent from the client side to the server. Then, in step 420, in response to the request, the server sends the controllers for implementing the prioritization of the contents within the web page to the client. Then in step 430, said controllers retrieve the contents from the server according to the priority order for display. The method of FIG. 4 ends in step 440.

As described above, contents in a web page can be divided into native content and elements, and either identical or different download and display mechanism can be implemented for native content and elements. For the process in FIG. 4A, actually, the native content is handled as one element having the highest priority, that is, identical download and display mechanism is implemented for both native content and elements. When different download and display mechanism are implemented for the native content and elements, the process in FIG. 4B can be performed, which is a variation of that in FIG. 4A.

The method of FIG. 4B begins in step 400' and then proceeds to step 410', wherein an access request for the web page is sent from the client side to the server. Then, in step 420', in response to the request, the server sends the native content in the web page as well as controller for implementing the prioritization of the elements within the web page to the client. Then in step 430', said client displays said native content, and simultaneously or subsequently in step 440', said controller retrieves the elements from the server according to the priority order of said elements for display. The method of FIG. 4 ends in step 450'. The method of FIG. 4B facilitates the download and display of the native content, and the native content can have no controller.

According to the invention, said native content can further comprise native content framework (which is used for ensuring the display regularity on the browser) and native content body (which is the content actually to be displayed). The process in FIG. 4B downloads the native content body and framework as a whole with the highest priority to the client. However, the process of FIG. 4B can be modified as follows.

In this modification, the native content body and the native content framework can be downloaded separately. That is, the native content framework is downloaded to the browser first, and then the controllers retrieve the native content body and elements to display. In this case, the native content body is actually treated as an element having the highest priority.

In addition, in the method of FIG. 4B and the modification thereof, said native content can be empty.

The embodiments of the invention will generally be described in connection with the process of FIG. 4B below (that is, the native content and controllers are retrieved first, and then elements are retrieved via controller). However, a skilled person can easily extend the embodiments to situations such as those in FIG. 4A and in the modification of FIG. 4B.

The system and process in which the controller retrieves and displays elements from the server are described below.

Figure 5:
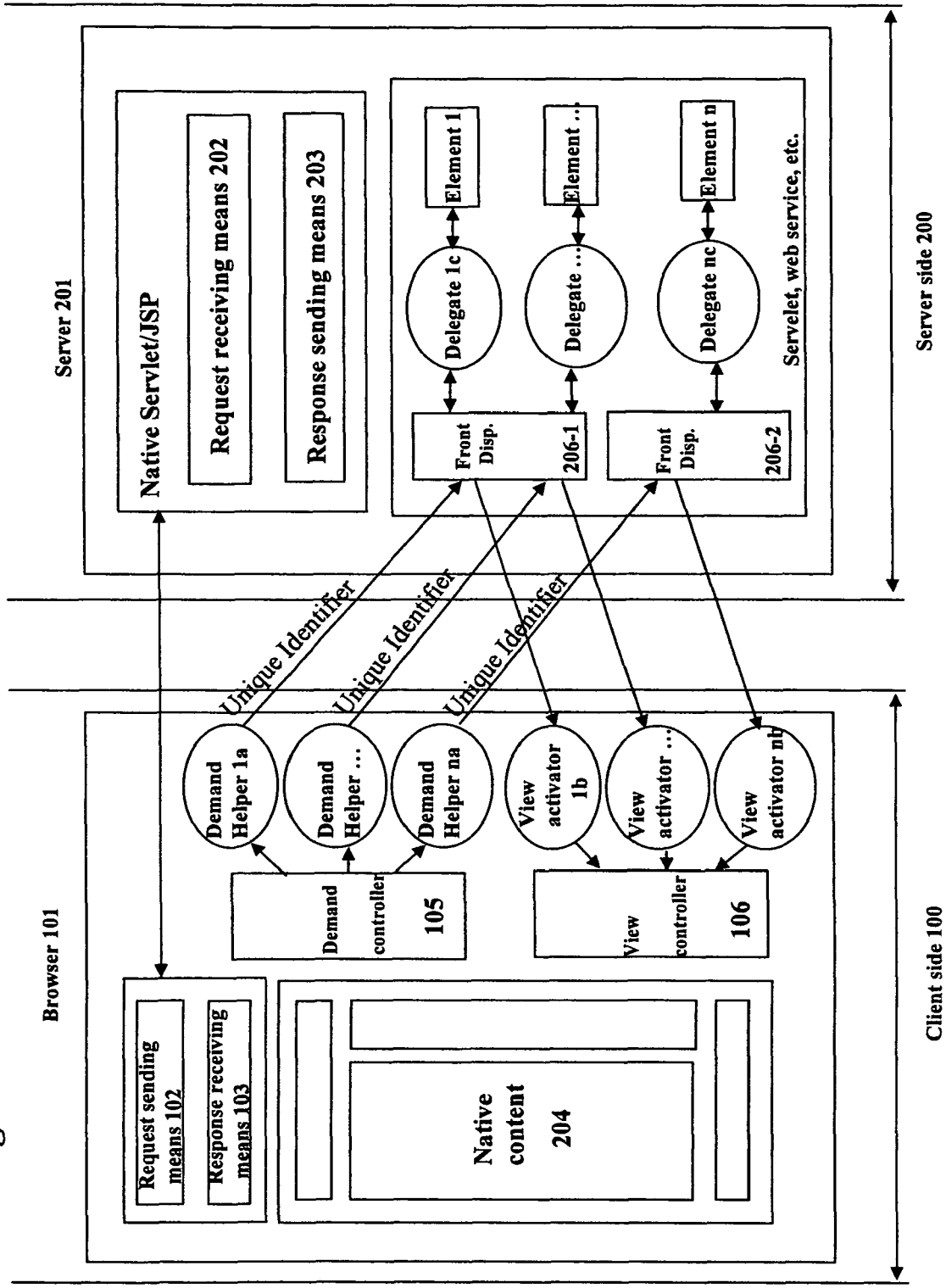
FIG. 5 is a system block diagram of one embodiment according to the invention.

The system is shown in FIG. 5. The system structure of FIG. 5 is similar to that of FIG. 3, except that the client side 100 in FIG. 5 further comprises demand helper and view activator, and that the server side 200 further comprises front dispatcher 206 and delegate, and that the native content 204 is downloaded to the client together with the controller of the elements. Only the difference between FIGS. 3 and 5 will be described.

When the controller starts to retrieve elements from the server, first the demand controller 105 invokes the demand helper and view activator of the element with for example the highest priority (here it is assumed to be the demand helper 1a and view activator 1b of the element 1). As mentioned before, if element 1 is simply a picture element, demand helper 1a can retrieve it from the server by using the identifier of it, so as to be displayed on the client. However, if element 1 is an element that can only be returned to the client side after being subjected to some processing at the server, the front dispatcher and delegate in FIG. 5 are required.

When element 1 is an element that can only be returned to the client side after being subjected to processing by the server, the element has its corresponding front dispatcher and delegate. At this time, said demand helper 1a also needs to know the corresponding front dispatcher of element 1 (assuming to be front dispatcher 206-1), and send the retrieve demand to front dispatcher 206-1. At front dispatcher 206-1, it will find the delegate corresponding thereto (e.g., delegate 1c) according to the identifier of element 1, and the request for element retrieving is processed by the delegate to be suitable for display on the client browser. Then, element 1 is retrieved to the view activator 1b of client side 100. Said view activator 1b sends the retrieved element 1 to the view controller 106 for display on the browser 101.

It should be appreciated that while it is shown for the demand helper to obtain the corresponding delegate via the front dispatcher, it is possible for the demand helper to obtain the corresponding delegate directly from the demand controller.

Figure 6:
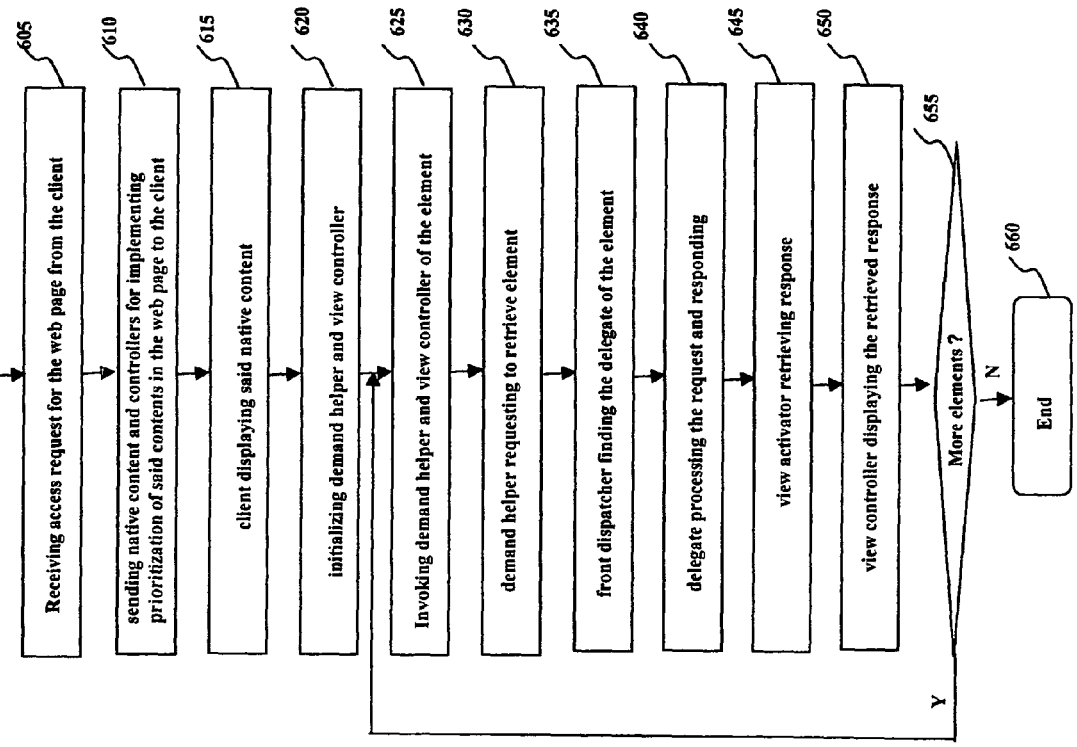
FIG. 6 is a flowchart of the method performed by the system of FIG. 5.

FIG. 6 is a flowchart of the method performed by the system of FIG. 5. Steps 600-615 correspond to steps 400-430 in FIG. 4, and thus their description will be omitted. At the same time or after native content is displayed in step 615, the method proceeds to step 620, wherein the demand helper and view controller are initialized. Said initialization can include the following operations: in step 625, the demand helper and view controller of the element with highest priority are invoked, and in step 630, the demand helper sends the request for element retrieve to the front dispatcher. After the initialization, in step 635, the front dispatcher finds the delegate of the element. Then in step 640, the delegate processes the request of the demand helper, so that in step 645 a response is sent to the view activator. Next in step 650 the view controller displays the retrieved response on the client browser. Subsequently in step 655, it is decided whether there is further element to be retrieved. If the decision is "yes", the method returns to step 625; otherwise, the method ends in step 660.

The system and method of the invention are described above with reference to FIGS. 2-6. By prioritizing the contents in the web page as needed and pre-determining the order of download and display, said system and method make it possible to always download and display content with highest priority first, and then download and display content with lower priority one by one in the descending order of priority. In this way, the response time experienced by the user is reduced, thus improving the user experience.

However, such system and method do not consider the congestion control problem during network peak time; moreover, they can not intercept request from certain IP addresses. In light of these problems, the system of FIG. 7 is proposed.

Figure 7:
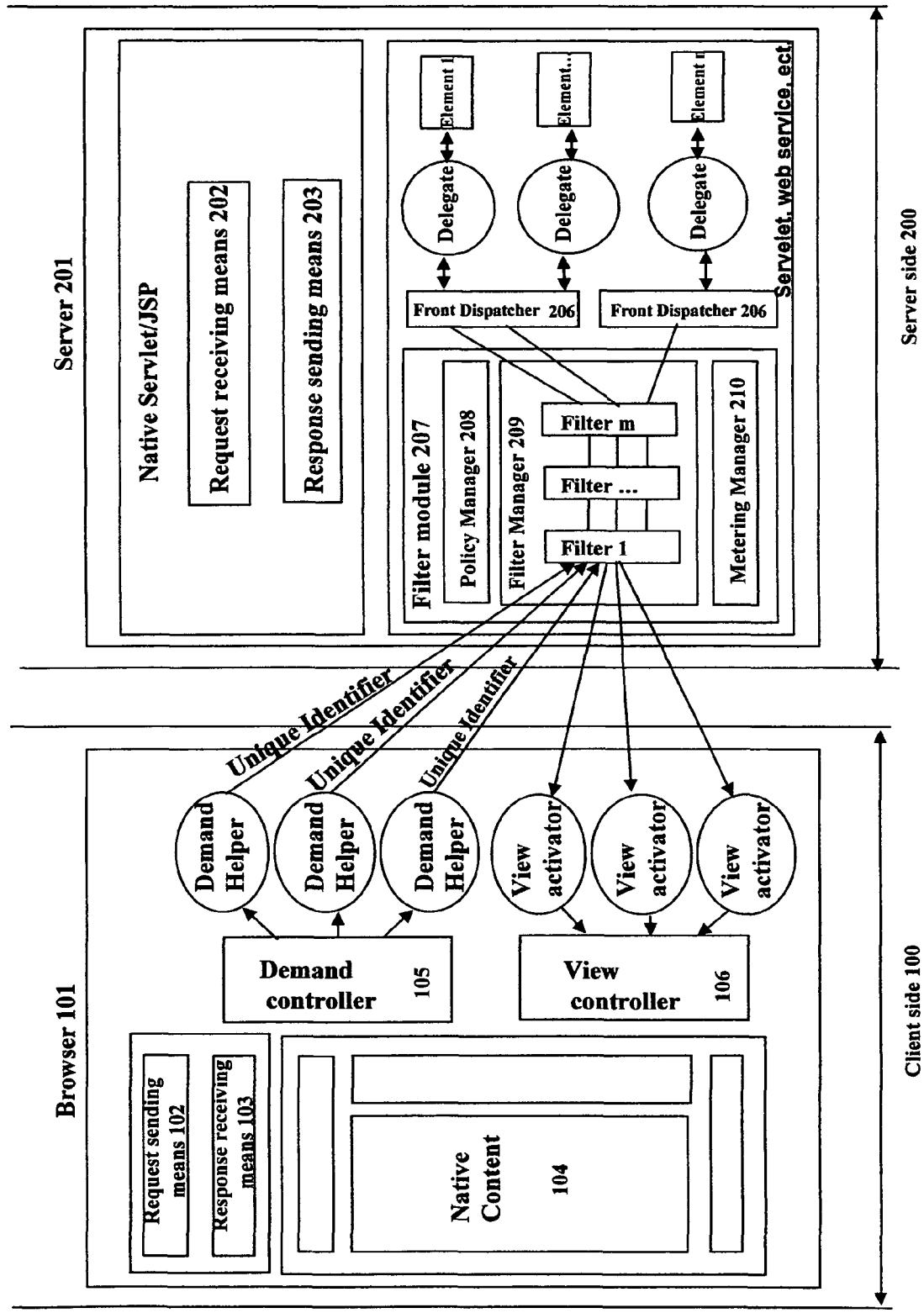
FIG. 7 is the block diagram of the system for congestion control.

The system of FIG. 7 is substantially identical to that of FIG. 5, except that FIG. 7 includes a filter module 207. Below, only the difference between FIGS. 5 and 7 will be detailed.

Said filter module 207 can include policy manager 208, filter manger 209 (including one or more filters 1-$m$), and may also include metering manager 210.

Said policy manager 208 contains rules predetermined by the web page developers with reference to the priority level and priority type of different elements, so that the request for element retrieve is filtered to avoid congestion during server peak time. Said rules can include one or more of the following: the parameters based on which filtering is carried out, and the conditions that should be satisfied for the request to be transmitted further (that is, passed) or discarded (that is, rejected). The parameters based on which filtering is carried out can be the element priority, current server status, IP address or the combination thereof, and so on. When filtering is carried out based on the element priority and/or current server status, a threshold for the request to be passed or rejected can be defined. When filtering is carried out based on the IP address, the IP address for which requests should be allowed or rejected can be defined. Moreover, according to a preferable embodiment of the invention, the predetermined rules can be dynamically modified during runtime as necessary.

Filter manager 209 can contain a single filter or a chain of filters, for applying the rules for congestion control according to the rules defined by policy manager 208, for filtering and sorting the demand for element retrieve, and thereby further prioritizing different web page element.

When filtering is carried out based on the current server status, said filter module 207 can also comprise metering manager 210, for monitoring the server status and sending the monitoring result to the filter manager 209, so that the filter manager 209 can filter according to the monitoring result and the rules defined by the policy manager 208.

Figure 8:
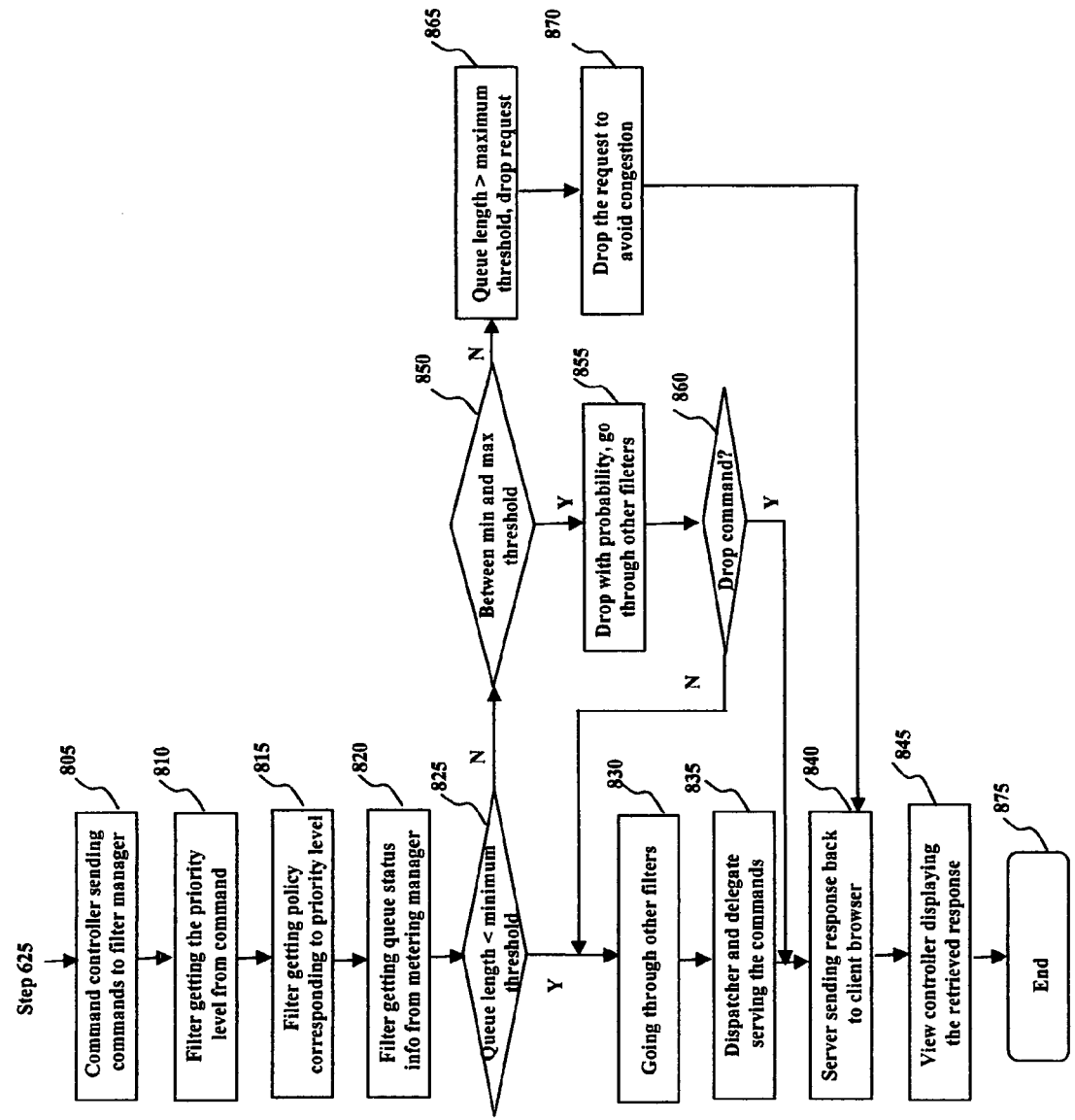
FIG. 8 is a flowchart of the method performed by the system of FIG. 7.

FIG. 8 is a flowchart of the method performed by the system of FIG. 7, by using the element priority and server status as filter parameters. The method of FIG. 8 descends from step 625 of FIG. 6, and then proceeds to step 805, wherein the demand helper sends the demand for web page element retrieve to the filter module. Then in step 810, the filter obtains the priority of the element from the demand, and proceeds to step 815. In step 815, the filter obtains the policy corresponding to said priority by checking the policy manager. Next in step 820, the filter acquires the queue status information reflecting the server status from the metering manager. Then in step 825, it is determined whether said queue status is less than the minimum threshold (e.g., 10% CPU utilization). If the determination is positive in step 825, the method proceeds to step 830, so that the request passes through the filter and goes into other filters (if any). Then the method enters step 835, wherein the demand is served by the dispatcher and delegate. Next in step 840, the server sends a response to the demand back to the client side, and in step 845 the view controller controls the display of the retrieved response.

If the determination is negative in step 825, the method goes to step 850, it is further determined whether the queue status is between the minimum threshold and maximum threshold (e.g., 60%-90% CPU utilization). If yes, the method enters step 855, it is decided that the request be discarded with predetermined probability (specified by the web page developers), then step 860 determines whether to discard the demand. If yes, the method returns to step 840, so that a response indicating that the demand is discarded is returned to the client; otherwise, the operation goes to step 830 and continues to perform step 830-845.

If the determination in step 850 is "no", the operation enters step 865 to detect that the queue length is longer than the maximum threshold (e.g., greater than 90% CPU utilization). As a result, the method goes into step 870, wherein the request is discarded to avoid congestion. Next, the method returns to step 840, to notify the client side that the request is discarded. The method of FIG. 8 ends in step 875.

With the method of FIG. 8, it is possible to achieve congestion control during network peak time and to support policy. Such policy may be price bidding and ranking (e.g., the more the advertiser paid, the earlier the ad is downloaded), and rolling queue method (e.g., download based on certain probability). In addition, experimental data indicates that, by using the system and method of FIGS. 7 and 8, it is possible to increase the number of requests handled by the server per second, improve the resource utilization, and increase the number of concurrent users supported.

Those skilled in the art would appreciate that, the embodiment of the invention can be provided in the form of a method, system or computer program product. Therefore, the invention may adopt the form of an all-hardware embodiment or combined software and hardware embodiment. A typical combination of hardware and software comprises a universal computer system with a computer program which is loaded and executed to control the computer system to execute the above method.

The present invention may be embedded in the computer program product that incorporates all the features enabling the method described herein to implement. The computer program product is contained in one or more computer readable storage medium (including but not limited to a disk memory, CD-ROM, optical memory etc.) that has computer readable program codes stored therein.

The present invention has been described with reference to the flowchart and/or block diagram of the method, system and computer program product according to the invention. Each block in the flowchart and/or block diagram and a combination of the blocks in the flowchart and/or block diagram obviously can be achieved by computer program instructions. These computer program instructions may be provided to a universal computer, dedicated computer, embedded type processor or processors of other programmable data processing equipments, to generate a machine to thereby instruct (through the computer or processors of other programmable data processing equipments) to generate means for achieving functions specified in one or more blocks in the flowchart and/or block diagram.

These computer program instructions may be stored in a read memory of one or more computer that can instruct the computer or other programmable data processing equipments to exert themselves in a particular way, such that the instructions stored in the computer readable memory generate a manufactured product that comprises means for achieving the instructions of the functions specified in one or more blocks in the flowchart and/or block diagram.

These computer program instructions may be loaded into one or more computer or other programmable data processing equipments, such that a series of operation steps are executed in the computer or other programmable data processing equipments, to thereby generate a computer-implemented process in each such equipment, so that the instructions executed in the equipment provide for the steps specified in one or more blocks in the flowchart and/or block diagram.

The above has described the principle of the invention in conjunction with the preferred embodiments of the invention, which, however, is illustrative and cannot be construed as limiting the invention. Various changes and variations may be made to the invention by those skilled in the art without departing from the spirit and scope of the invention as defined in accompanying claims.

The invention claimed is:

1. A method for controlling display of contents of a web page on a client, said method comprising the steps of:
    sending an access request for the web page from the client to a server;
    in response to said access request, receiving controllers from said server for implementing prioritization of said contents in the web page; and
    said controllers retrieving said contents of the web page from the server according to priority order for display,
    wherein said controllers comprise:
    a demand controller for retrieving said contents to the client in accordance with a priority of each of said contents; and
    a view controller for displaying said contents on the client in accordance with the priority of each of said contents.

2. The method according to claim 1, wherein said retrieving the contents to the client in accordance with the priority of each of said contents further comprises:
    invoking a demand helper and a view activator in accordance with the priority of each of said contents; and
    retrieving said content by said demand helper by using a unique identifier of said content.

3. The method according to claim 2, wherein said retrieving said content by said demand helper by using the unique identifier of said content further comprises:
    determining whether to retrieve a particular content based on a predetermined policy;
    wherein said predetermined policy includes at least one of the following:
    content priority, current server status, IP address of the client issuing the web page request, and
    wherein said predetermined policy is dynamically changeable during runtime.

4. The method according to claim 3, wherein said determining whether to retrieve a particular content based on a predetermined policy further comprises:
    monitoring current server status;
    determining whether to retrieve a particular content based on content priority, monitored server status and the predetermined policy.

5. The method according to claim 2, wherein said retrieving said content by said demand helper by using a unique identifier of said content further comprises:
    sending a demand for retrieving content to a front dispatcher,
    finding a delegate corresponding to the content by the front dispatcher by using the unique identifier of said content, and
    operating on the content by the delegate before retrieving the content back to the client.

6. The method according to claim 1, wherein said displaying the content on the client in accordance with the priority of each of said content further comprises:
- transferring retrieved content to a view controller by a view activator;
- displaying, by the view controller, the retrieved content on a client browser.

7. The method according to claim 1, further comprising:
- in response to said request, receiving from the server native content as well as the controllers for implementing prioritization of contents in the web page to the client;
- said client displaying said native content, and
- said controllers retrieving elements from the server according to the priority order of the elements for display.

8. The method according to claim 7, wherein said native content comprises native content framework and native content body, and said native content body can be empty.

9. A server for controlling display of contents of a web page on a client comprising:
- a processor;
- request receiving means for receiving an access request for a web page from the client;
- and response sending means for, in response to said access request, sending controllers for implementing prioritization of said contents in the web page to the client, wherein said controllers comprise a demand controller and a view controller, said demand controller being used for retrieving said contents to the client in accordance with a priority order of each of said contents, and said view controller being used for displaying said contents on the client in accordance with the priority order of each of said contents.

10. The server according to claim 9, wherein said demand controller further comprising at least one demand helper corresponding to the content, said at least one demand helper being invoked according to the order of content priority, so as to retrieve each of said contents.

11. The server according to claim 9, further comprising:
- a filter module, comprising:
- a policy manager, containing a predetermined policy,
- a filter manager, for determining whether to retrieve a particular content based on the predetermined policy,
- wherein said predetermined policy includes at least one of the following:
- content priority, current server status, IP address of the client issuing the web page request, and wherein said predetermined policy is dynamically changeable during runtime.

12. The server according to claim 11, said filter module further comprising:
- metering manager, for monitoring the current server status; and
- filter manager, for determining whether to retrieve a particular content based on content priority, monitored server status and predetermined policy.

13. The server according to claim 10, further comprising:
- a front dispatcher, having a particular function, for receiving a demand for retrieving content from the demand helper, and finding a delegate corresponding to the content, for operating on the content so as to return the content back to the client.

14. The server according to claim 9, wherein said view controller further comprising view activators for receiving retrieved content from the server, so as for the view controller to display.

15. The server according to claim 9, wherein said response sending means sends native content and the controllers for implementing prioritization of the contents in the web page to the client.

16. The server according to claim 15, wherein said native content comprising native content framework and native content body, and said native content body can be empty.

17. A client for displaying contents of a web page comprising:
- a processor;
- request sending means for sending an access request for the web page to a server;
- response receiving means for receiving controllers from the server for implementing prioritization of said contents in the web page from the server, said controllers retrieving contents from the server according to the priority order of the contents, wherein said controllers comprise a demand controller and a view controller, said demand controller being used for retrieving said contents to the client in accordance with a priority order of each of said contents, and said view controller being used for displaying said contents on the client in accordance with the priority order of each of said contents;
- and a browser for displaying the retrieved contents.

18. A system for controlling display of a web page comprising:
- a server computer system, comprising:
- a processor;
- request receiving means for receiving an access request for a web page from a client;
- response sending means for, in response to said access request, sending controllers for implementing prioritization of said contents in the web page to the client; and
- a client computer system, comprising:
- a processor;
- request sending means for sending an access request for the web page to the server;
- response receiving means for receiving controllers from the server for implementing prioritization of said contents in the web page from the server, so that said controllers retrieve contents from the server according to the priority order of the contents, wherein said controllers comprise a demand controller and a view controller, said demand controller being used for retrieving said contents to the client in accordance with a priority order of each of said contents, and said view controller being used for displaying said contents on the client in accordance with the priority order of each of said contents; and
- a browser for displaying the retrieved contents.

* * * * *